No. 759,058. PATENTED MAY 3, 1904.
V. G. APPLE.
STORAGE BATTERY.
APPLICATION FILED JUNE 5, 1901.
NO MODEL. 2 SHEETS—SHEET 1.
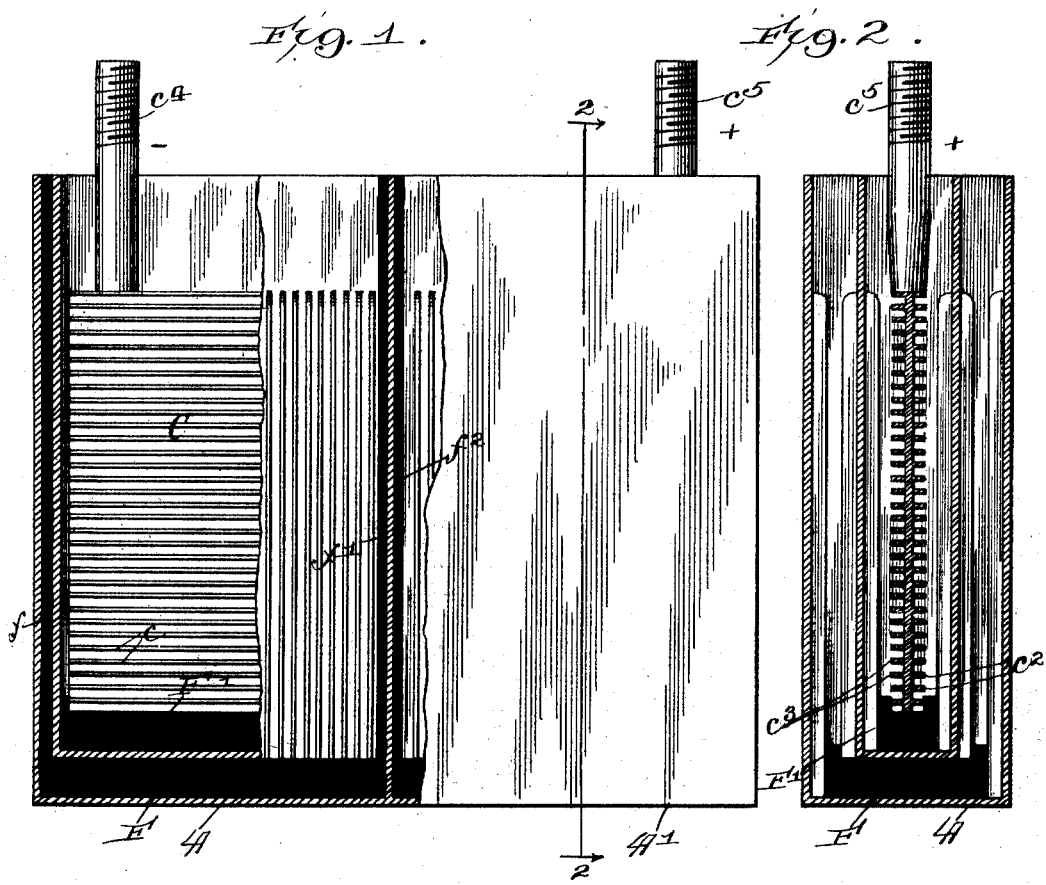
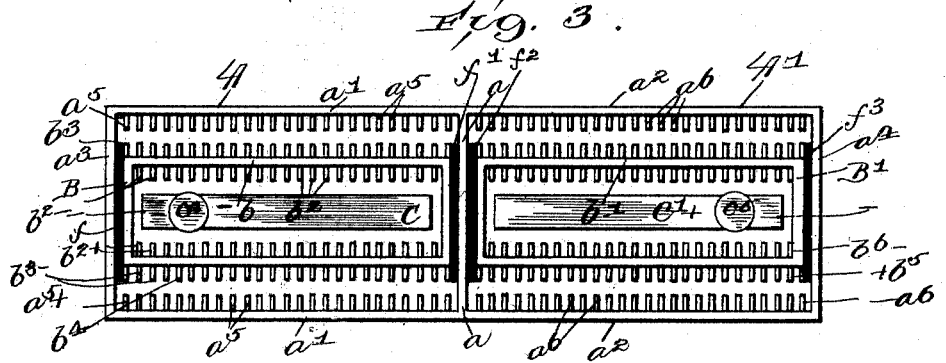
Witnesses:
Ray White
Henry B. White
Inventor:
Vincent G. Apple
By Jones Bain, Attorney.

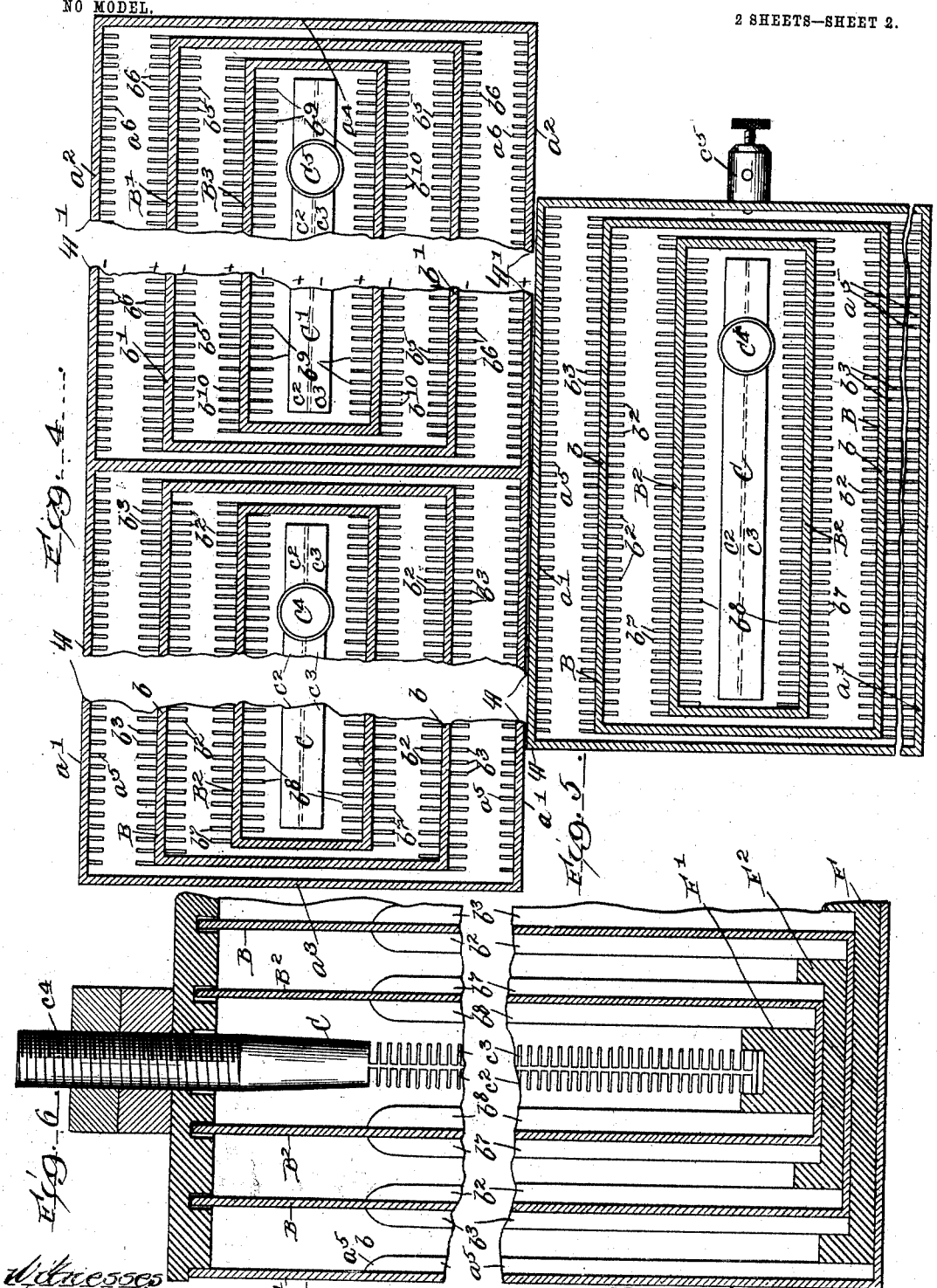

No. 759,058.

Patented May 3, 1904.

UNITED STATES PATENT OFFICE.

VINCENT G. APPLE, OF DAYTON, OHIO.

STORAGE BATTERY.

SPECIFICATION forming part of Letters Patent No. 759,058, dated May 3, 1904.

Application filed June 5, 1901. Serial No. 63,194. (No model.)

*To all whom it may concern:*

Be it known that I, VINCENT G. APPLE, of Dayton, in the county of Montgomery and State of Ohio, have invented certain new and useful Improvements in Storage Batteries; and I hereby declare that the following is a full, clear, and exact description thereof, reference being had to the accompanying drawings, which form part of this specification.

My invention relates to improvements in storage batteries.

One of the objects of my invention is to provide a battery which is susceptible of producing a high electromotive force as a constructional unit.

A further object I have in view is to provide a battery which is entirely devoid of joints and in which the usual clamped or soldered contact of one metal body with another for the purpose of preserving the integrity of the electrical circuit through the construction of a cell or series of cells in a battery is not a part of its construction.

A further object of my invention is to provide a battery of a series of cells which shall have all of the advantages of cells when contained in insulated containing cases, but with which such cases are not essential.

A still further object is to be able to condense a large capacity within a small area and to provide a battery having a small weight for its capacity.

With these and other features which may hereinafter appear my invention consists in the constructions and combinations hereinafter pointed out and more specifically claimed.

In the drawings forming a part of this specification, Figure 1 is an elevation of one of my battery units, partly in section. Fig. 2 is an elevation through a transverse section taken on line 2 2 of Fig. 1. Fig. 3 is a plan view of the same. Fig. 4 is a broken-away plan sectional view of a double-compartment case, each containing two liquid-tight cells providing three electric couples in each compartment. Fig. 5 is a similar view of a similar single compartment containing two cells and a central electrode. Fig. 6 is an elevation of same in section.

In all of the views the same letters of reference indicate similar parts.

A and A' comprise jointly the outside containing case, divided in the center by a partition $a$. This case is made of a material of which the electrodes of the battery may be composed, and the partition $a$ is preferably composed of the same material. The partition divides the case into two compartments, (designated A and A'.)

B and B' are single cells made, preferably, of similar material and adapted to be contained in the respective compartments.

C and C' are electrode elements or plates to be each contained in their respective cells B and B'. In Figs. 4, 5, and 6 cells $B^2$ and $B^3$ are shown inside of and insulated from cells B and B'.

$a'$, $a^2$, $a^3$, and $a^4$ are the outside walls of the respective exterior containing cases. The walls $a'$ have interiorly-projecting ribs $a^5$, and the walls $a^2$ have similar ribs $a^6$, between which the active material of the battery is to be contained. The interior cells B and B' are composed of the walls $b$ and $b'$. These side walls have interiorly and exteriorly projecting ribs $b^2$ and $b^3$ and $b^5$ and $b^6$, respectively. The cells $B^2$ and $B^3$ are provided with interior and exterior ribs $b^7$ and $b^8$ and $b^9$ and $b^{10}$, respectively. The ribs which I have described as being attached to the walls of the various cells are shown in the drawings in a vertical position for the purpose of facilitating construction; but they may be made horizontally or otherwise instead of vertically when so desired.

The central electrode elements or plates C and C' are provided with ribs similar to those attached to the walls of the cells. In this case they are shown horizontally. Between these ribs the active material is placed. These plates are provided with their respective battery-terminals $c^4$ and $c^5$. These terminals constitute the points of the greatest difference of potential in the combined unit. The ribs on these plates are indicated by $c^2$ and $c^3$.

F is an insulator adapted to be placed in the bottom of the compartments A and A', grooved in its top surface for the reception of the interior cells B and B'. It is made, preferably, of hard rubber and is provided at either end with vertical strips $f$ and $f'$ of insulating substances, such as hard rubber, which separate the interior cell from the side walls of the exterior cell. F' is a similar strip of insulating material, such as hard rubber, which is designed to lie in the bottom of the interior cell for the purpose of insulating the interior plates C and C' from the walls of the cell in which it is contained. $F^2$ is a similar insulator for electrically separating the nesting cells.

The upper ends of the plates C and C' may be retained in position by the cover of the respective compartments through which the terminals $c^4$ and $c^5$ pass.

I prefer to make the entire metal portion of my battery unit of an alloy of lead and antimony; but, as before stated, other material, such as may be used for electrodes of such batteries, may be employed in its construction.

When the battery has been constructed in the manner shown and described and the parts have been assembled as shown in the drawings, an electrolyte is placed in the respective compartments or cells, and the battery may be charged by connecting the terminals of the source of electric energy to the terminals of the battery, $c^4$ and $c^5$. If the electromotive force of a single couple is, say, two volts, then when the connections are made to these terminals $c^4$ and $c^5$ the electromotive force of the entire unit will be eight volts, as there are four couples contained in the entire construction of the battery. These couples in both the single and double units may be increased in number by increasing the number of intermediate cells B and B', and the combined electromotive force of the unit will be correspondingly increased, as shown in Figs. 4, 5, and 6.

The cells may be cast or forced by hydraulic pressure of lead or of an alloy or such other metal or material as may be chosen for this purpose or which is adapted for battery plates or elements, and the spaces between the ribs may be filled with active material, such as red lead or the like, by applying it in the form of a paste, paint, or cement, or the said spaces may be filled by any well-known electrochemical or other process, in which event pure lead may be used in part in the construction of the various active parts of my battery.

My cell is particularly useful and advantageous in connection with automobiles or other moving vehicles where joints that are made by soldering or otherwise connecting together pieces of metal to preserve the integrity of the electric circuit are a source of great trouble and annoyance caused by breaking loose, and thereby opening the circuit as a result of the jarring or motion of the vehicle.

It is of course evident that the cell A, with its contents, and the cell A', with its contents, may be made independent of each other into two separate units, as shown in Fig. 5, and it is also evident that as a result of such construction the total voltage of the unit under the conditions described would be only four volts instead of eight.

I have designated in connection with the respective reference-letters the polarity of the various surfaces or elements composing my battery unit.

Having described my invention, what I claim as new and useful, and desire to secure by Letters Patent of the United States, is—

In a storage battery, a battery-containing conducting-case divided into two compartments, the inside surfaces of each compartment electrochemically active, a series of liquid-tight conducting-cases, one within the other and insulated one from the other, their respective interior and exterior surfaces electrochemically active, within each compartment, and a central element within the inner case of each compartment constituting the electrodes, substantially as set forth.

In testimony that I claim the foregoing as my own I affix my signature in presence of two witnesses.

VINCENT G. APPLE.

In presence of—
 FORÉE BAIN,
 M. F. ALLEN.